Aug. 7, 1934.   T. BARISH   1,968,925
UNIVERSAL JOINT
Filed Dec. 19, 1931   2 Sheets-Sheet 1

INVENTOR
Thomas Barish
BY
Geo. B. Ingersoll,
ATTORNEY.

Aug. 7, 1934.  T. BARISH  1,968,925
UNIVERSAL JOINT
Filed Dec. 19, 1931  2 Sheets-Sheet 2
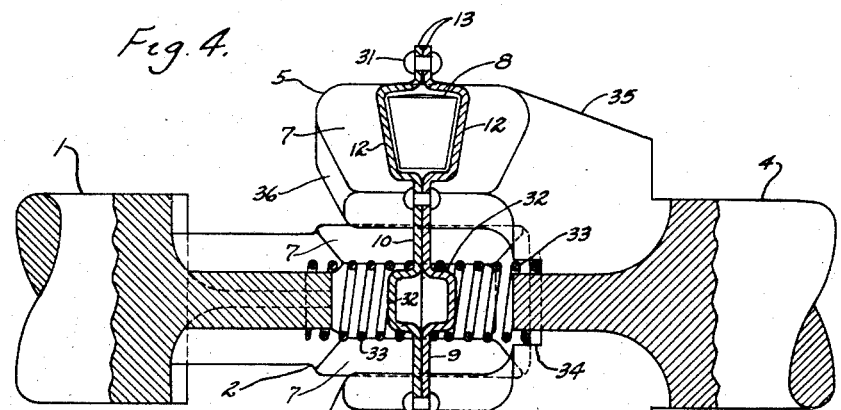
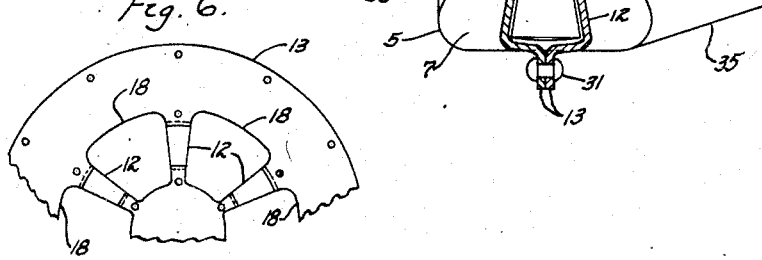
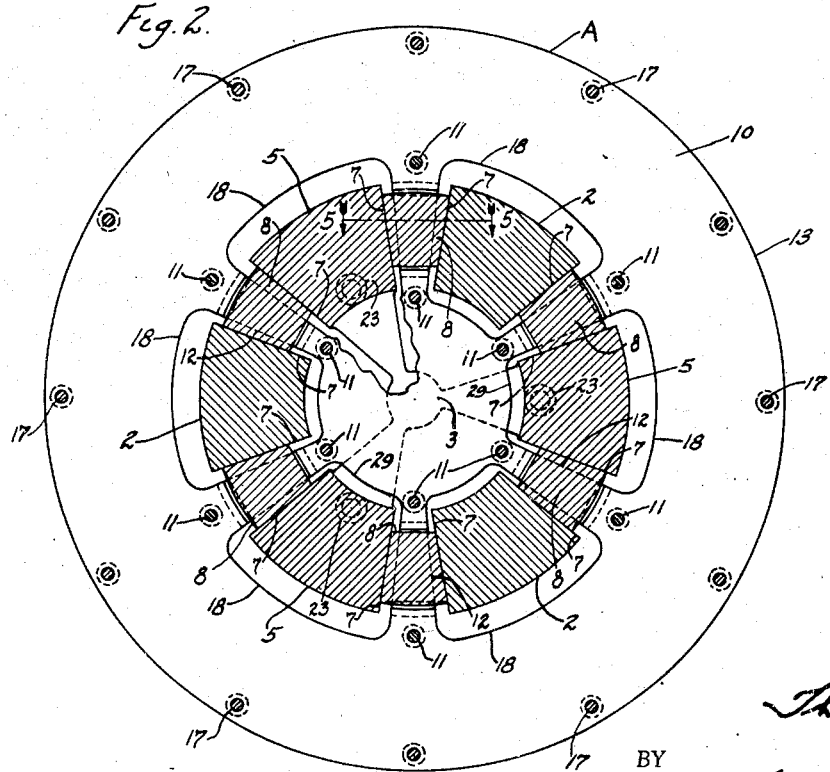
INVENTOR.
Thomas Barish
BY
Geo. B. Ingersoll
ATTORNEY.

Patented Aug. 7, 1934

1,968,925

UNITED STATES PATENT OFFICE 1,968,925

UNIVERSAL JOINT

Thomas Barish, Jamestown, N. Y.

Application December 19, 1931, Serial No. 582,063

24 Claims. (Cl. 64—91)

My invention relates to improvements in universal joints for automotive vehicles; and the objects of my improvements are, first, to provide a universal joint incorporating coupling members having straight faces for engaging roller members; second, to provide a universal joint having driving and driven members capable of axial movement relative to one another; third, to provide a universal joint having axial movement of its driving and driven members without employing splined members; fourth, to provide a universal joint having a floating holder unit for containing roller members; fifth, to provide a universal joint employing a roller holding unit having spherical sealing surfaces; sixth, to provide a universal joint mechanism incorporating resilient members for positioning a roller holding member therein; seventh, to provide a universal joint mechanism having a roller enclosing member enclosing resiliently actuated enclosing members; eighth, to provide a universal joint mechanism having oppositely disposed spherical members enclosed by a floating roller enclosing mechanism; and, ninth, to provide a universal joint mechanism having driving and driven members enclosed by members permitting relative axial and angular movement of the driving and driven members.

I attain these objects by the mechanism illustrated in the accompanying drawings, in which—

Figure 3:
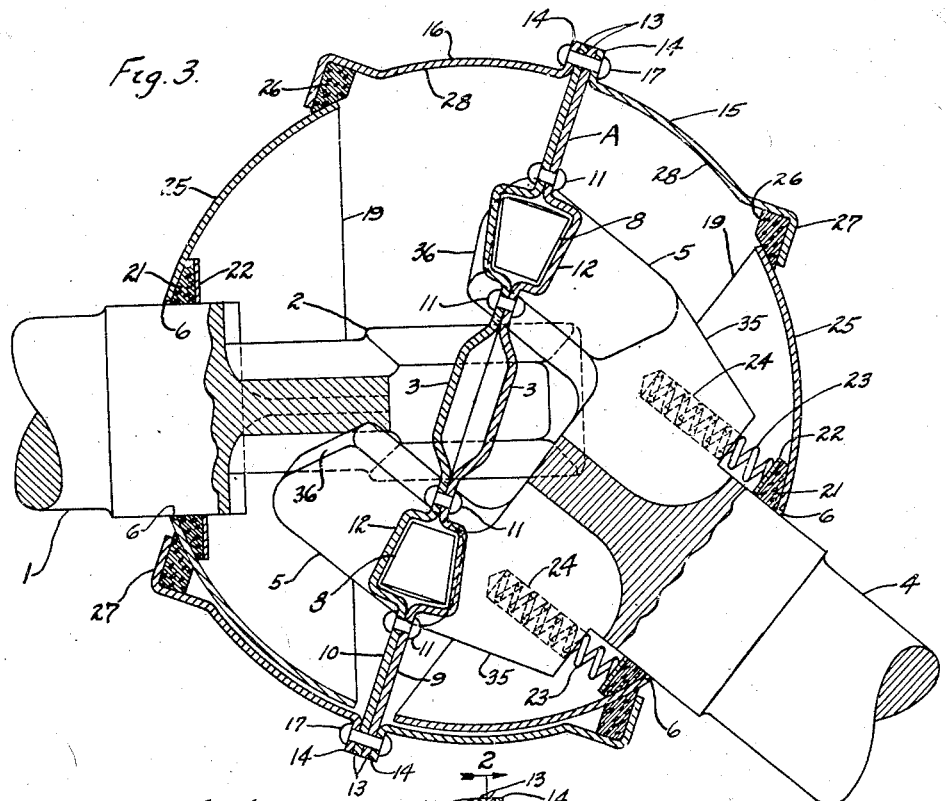
Figure 1:
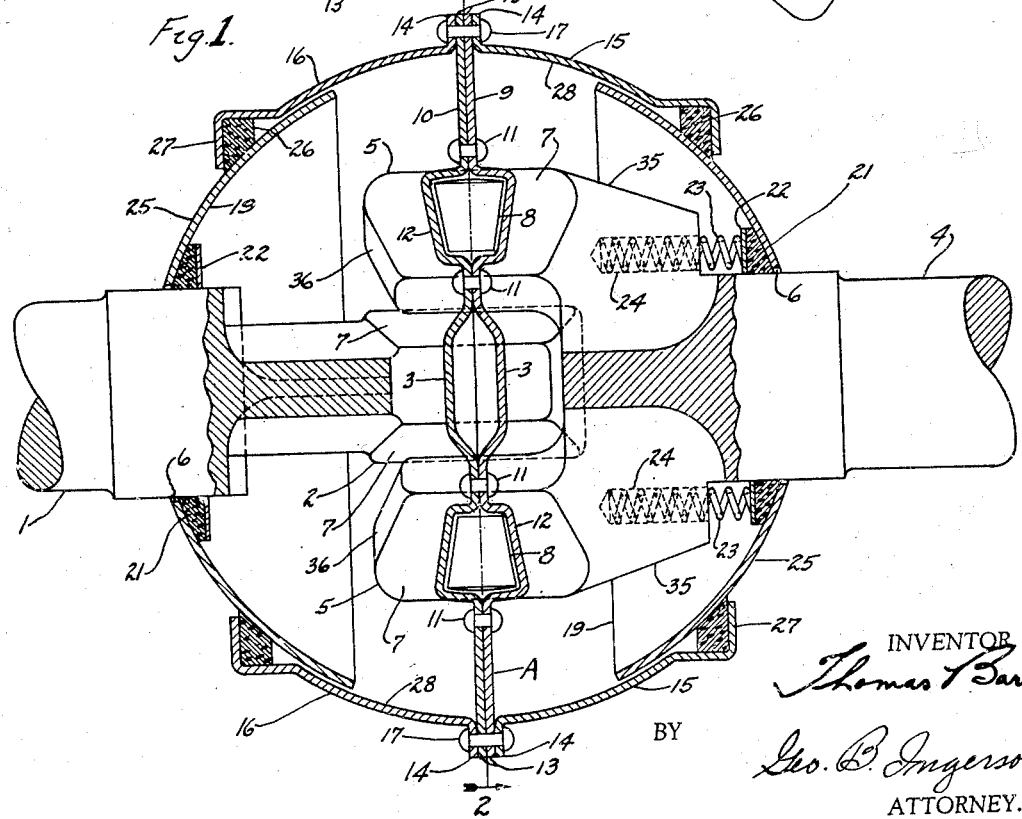

Figure 1 is a vertical sectional view along the longitudinal axis of the shafts connected by the universal joint assembly, the shafts being located on a common axial line; Fig. 2, a vertical section of the universal joint assembly taken along the broken line, 2—2, Fig. 1; Fig. 3, a vertical sectional view of the universal joint assembly with the connected shafts located at an angle with one another; Fig. 4, a vertical sectional view of the universal joint assembly when used without enclosing means; Fig. 5, a partial sectional view taken on the line 5—5, Fig. 2; and Fig. 6, a partial side elevation of one of the roller retaining members.

Similar numerals refer to similar parts throughout the several views.

The shaft 1 is provided with the coupling or coacting or segmental portions 2, and the shaft 4 is provided with the coupling or co-acting or segmental portions 5. The coupling portions 2, if desired, may be formed integrally with the shaft 1 and the coupling portions 5, if desired, may be formed integrally with the shaft 4.

The coupling portions 2 of the shaft 1 and the coupling portions 5 of the shaft 4 are each provided with inclined or radial surfaces 7 which engage the roller members 8. It is to be noted that the inclined surfaces 7 are formed with straight surfaces which incline or converge approximately toward the center of the universal joint assembly, the inclined surfaces 7 fitting the tapered sides of the roller members 8. The roller members 8 are supported in the holder assembly A which is a separate floating unit unrestrained with respect to the universal joint members except by contact therewith through the medium of the rollers 8 which thereby tend to always maintain the rollers 8 in their proper radial positions relative to the center of the universal joint mechanism.

The holder assembly A comprises the retainer members 9 and 10 which may be fastened together by the rivets 11. The retainer members 9 and 10 are each provided with offset portions 12 which partially enclose each of the rollers 8, the offset portions 12 being fitted around the rollers 8 so that the rollers 8 will be retained therewithin with sufficient clearance so that the rollers 8 will rollably contact with the inclined surfaces 7, the offset portions 12 being only of sufficient width so as to avoid contact with the inclined surfaces 7 and at the same time retain the rollers 8 by extending radially around the rollers 8 throughout a portion of their circumference, as disclosed in Fig. 5. The retainer members 9 and 10 may be each further provided with the offset portions 3' at their central portions to provide greater rigidity.

The retainer members 9 and 10 are further provided with the peripheral flange portions 13 which are fastened together and to the flanges 14 of the housing members 15 and 16, the flanges 13 and 14 being fastened together by the rivets 17.

It is to be noted that the holder assembly A will maintain the rollers in their proper operative positions, the rollers 8 being maintained in their proper contactual position relative to the inclined surfaces 7 of the coupling portions 2 and 5 and relative to the axial centers of the shafts 1 and 4, and at the same time the holder assembly A is free to assume a position of angularity approximately one half as large as the total angularity assumed by the shafts 1 and 4 when operating in other than a straight line or around a common axial center. Fig. 3 discloses such a position of the holder assembly A, the shafts 1 and 4 operating at an angle with one another. It is to be further noted that the retainer members 9 and 10 are each provided with the openings 18 through which extend the coupling portions 2 and 5, the openings 18 being sufficiently larger than said coupling portions extending therethrough so as to permit the holder assembly A to maintain angular positions relative to said coupling portions as disclosed in Fig. 3.

Each of the shafts 1 and 4 are provided with a retainer member 19 which encloses the shaft with which it is associated. The retainer members 19 are each provided with a packing member 21 which is compressed against the retainer member 19 by the plate 22 which is always forced against the packing material 21 by the springs 23. Each of the coupling portions 2 and 5 are provided with a hole 24 in which is seated the spring 23. It is to be noted that each of the plates 22 may be actuated by three springs 23, as each of the shafts 1 and 4 are provided with three coupling portions as more fully disclosed by dotted lines relative to one of the shafts 4 in Fig. 2.

It is to be noted that the plates 22 and the retainer members 19, will each be provided with central openings through which the shafts 1 and 4 extend with clearance therearound while the packing material 21 will fit tightly around the shafts 1 and 4 to exclude dirt and foreign matter from the inside of the universal joint assembly and to retain lubricant within the universal joint assembly. Each of the retainer members 19 are further formed to provide a spherical surface 25 on which slidably moves the packing material 26 which extends circumferentially around the spherical surface 25, the packing material 26 being retained by the offset portions 27 of the retainer members 15 and 16. The housing members 15 and 16 are formed to provide the spherical surfaces 28 which are thus adapted to enclose and move adjacent the spherical surfaces 25 of the retainer members 19 when the universal joint assembly assumes an angular position as disclosed in Fig. 3.

It is to be noted that the holder assembly A, as disclosed in Fig. 3, will be further maintained in its proper operative position relative to the retainer members 19 by the packing material 26 contacting with the spherical surface 25, the holder assembly A being adapted to oscillate relative to its retainer members 19, when the universal joint assembly is operating at an angle as disclosed in Fig. 3. It is to be noted that the spherical surfaces 25 of the retainer members 19 will be continually forced against the packing material 26 by the springs 23, thus further providing dirt and foreign material excluding means as well as means for further retaining lubricant within the universal joint assembly at all times.

It is to be understood that my universal joint mechanism may be utilized for transmitting power through angles approximately of a maximum of 40 degrees, the holder assembly A constituting a floating unit around the shafts 1 and 4 and thus rendering possible this maximum degree of angular movement relative to one another.

It is also to be noted that the springs 23 will not only maintain the packing materials 26 in close contact with the spherical surfaces 25 but will also maintain the holder assembly A with its roller members 8 approximately at its central position between the coupling portions of the shafts 1 and 4.

It is also to be further noted that the use of the tapered roller members 8 contacting with and rolling on the straight surfaces 7 of the coupling members will permit the shafts 1 and 4 to have perfectly free longitudinal axial movement within the universal joint assemblies, thus eliminating the necessity of providing the shafts 1 and 4 with sliding splined connections to their driving or driven members (not shown), thus further permitting a considerable saving in the manufacture of universal joint assemblies. When the shafts 1 and 4 thus move in a longitudinal or axial direction, the rollers 8 will only move one half of the longitudinal distance by which the shafts 1 and 4 separate or move together.

Also whereas only six roller members 8 are disclosed, my invention will be readily adapted to accommodate any desired number of rollers, as for instance, four, eight, ten, twelve, or more, the number depending on the particular design and the amount of power to be transmitted.

It is further to be noted that my invention will transmit power uniformly regardless of the angle between the connecting shafts 1 and 4, thus eliminating periodic fluctuations with the usual type of universal joint. Also because of the length of the roller members 8, my invention provides means for transmitting greater torque capacity in installations where a limited space is provided for the operation of the universal joints. When it is desired to use my universal joint assembly without any enclosing housing, in order to accomplish further simplicity or economy, the retainer members 9 and 10 may be fastened, at their peripheries, to each other by the rivets 31 as disclosed in Fig. 4, the retainer members 9 and 10 being respectively provided with the bosses 32 for locating the springs 33 which are here retained in the holes 34 which are formed on the inner or front portions of the coupling members 2 and 5 instead of their rear portions as disclosed in Figs. 1, 2, and 3, each of the retainer members 10 and 9 being actuated to their central position by one spring 33 retained in each pair of coupling members formed integrally with each of the shafts 1 and 4. Each of the coupling portions 2 and 5 may be provided with the angular surfaces 35 and 36 to provide necessary clearances between the coupling portions 2 and 5 and within the holder assembly A when the shafts 1 and 4 are operating in angular positions relative to one another.

It is also to be understood that my invention may be used with shaft members incorporating splined portions when desired.

I claim:

1. In a universal joint, the combination of a pair of members capable of relative angular displacement, each of said pair of members being provided with a plurality of flat working surfaces converging approximately toward a common center, a pair of retainer members provided with oppositely disposed offset portions forming partial enclosures extending between the flat working surfaces of said pair of members, said retainer member being provided with a pair of flange portions extending around said pair of members, spherical members suitably attached to the flange portion of said retainer member, spherical members adjacent said first mentioned spherical members, packing material between said first mentioned and said second mentioned spherical members, packing material between each of said first mentioned pair of members and one of said last mentioned spherical members, means for maintaining pressure on said first mentioned packing material, and movable members between the flat working surfaces of said first mentioned members, each of said movable members being retained in one of the partial enclosures of said retainer member.

2. In a universal joint, the combination of a pair of members each provided with a plurality of segment portions, each of said segment portions being further provided with flat surfaces converging approximately toward a common center, members suitably supported between the segment portions of said first mentioned members, said last mentioned members engaging the flat surfaces of the segment portions of said first mentioned members, and means for retaining said last mentioned members in their operative positions, said means being provided with housing portions extending longitudinally adjacent the longitudinal sides of said last mentioned members.

3. In a universal joint, the combination of a pair of members, each provided with a plurality of segment portions, said pair of members being further provided with flat approximately radial surfaces extending completely along their segment portions, members rollably engaging the flat radial surface of said members, and means for retaining said last mentioned members in their operative positions, said last mentioned means being provided with a plurality of openings therethrough, each of said openings surrounding one of said segment portions.

4. In a universal joint, the combination of a pair of members capable of relative angular displacement, said members being provided with co-acting portions having flat approximately radial faces, members movably mounted between the co-acting portions of said members to permit forces to be transmitted from one co-acting portion to the other, and means for retaining said second mentioned means to prevent relative displacement thereof in a radial plane, said last mentioned means being movably mounted relative to said first mentioned members, said last mentioned means being provided with openings to permit said co-acting portions to movably extend therethrough.

5. In a universal joint, the combination of a pair of members capable of relative angular displacement, said members having co-acting portions with flat approximately radial faces, conical members spacing the co-acting portions of said first mentioned members, said conical members rollably engaging the flat approximately radial surfaces of the co-acting portions of said members, and movably mounted means for retaining said conical members, said movably mounted means being provided with transversely extending openings for receiving said co-acting portions therethrough, said movably mounted means being further provided with openings extending transversely to said surfaces of the co-acting portions engaged by said conical members.

6. In a universal joint, the combination of a pair of members having co-acting portions, roller members between the co-acting portions of said pair of members, and a retaining member for said roller members, said retaining member being provided with portions oppositely disposed about each of said roller members, said portions being provided with side walls conforming to the shape of said roller members, said retaining member being further provided with a flange portion extending radially inwardly and outwardly from its first mentioned portions.

7. In a universal joint, the combination of a pair of members having co-acting portions, rollers each engaging a co-acting portion of each of said pair of members, spherical members oppositely disposed about said pair of members, packing means engaging said spherical members, resilient means between said pair of members and said packing means and retaining means for said rollers, said retaining means being provided with spherical portions extending adjacent said spherical members.

8. In a universal joint, the combination of a pair of members having co-acting portions, roller members each contacting co-acting portions of each of said pair of members, a pair of members partially enclosing said roller members, said last mentioned pair of members being provided with apertures for receiving the co-acting portions of said first mentioned pair of members therethrough, said last mentioned pair of members each being provided with flange portions extending entirely around each of said co-acting portions, and means for fastening said last mentioned pair of members together.

9. In a universal joint, the combination of a pair of members for transmitting power, a plurality of roller members between said first mentioned pair of members, and means for retaining said roller members, said means being provided with portions enclosing each of said roller members, said portions having oppositely disposed openings with surfaces therebetween for engaging said roller members, said oppositely disposed openings allowing said roller members to extend laterally therethrough for engagement with said first mentioned pair of members.

10. In a universal joint, the combination of a pair of power transmitting members provided with co-acting portions, said power transmitting members being adapted to move axially relative to one another, rollably mounted members mounted between and engaging the co-acting portions of said power transmitting members, means for retaining said rollably mounted members in spaced radial positions, said last mentioned means being maintained, by contact with said rollably mounted members, in a position in which its axis bisects an angle between the axis of said power transmitting members, and resilient means positioning said first mentioned means longitudinally of said power transmitting members.

11. In a universal joint, the combination of a pair of members provided with co-acting portions, movable members between the co-acting portions of said members, means for retaining said members, means for retaining said movable members in their operative positions, said means including a pair of members secured together to form a housing around said movable members, each of said members being provided with portions extending around each of said co-acting portions, a pair of members secured to said means, each of said pair of members being provided with a spherical surface, members adjacent each of said pair of members, each of said last mentioned pair of members being provided with a spherical surface, and packing means between the spherical surfaces of said pair of members and the spherical surfaces of said last mentioned members.

12. In a universal joint, the combination of a pair of shaft members provided with co-acting portions, said shaft members being adapted to move axially to one another, rollable members each contacting one of said co-acting portions of each of said shaft members, and retainer means partially enclosing said rollable members to allow said rollable members to project therefrom to contact said co-acting portions of said shafts, said retainer means being adapted to oscillate relative to said shaft members.

13. In a universal joint, the combination of driving and driven members, each having a plurality of surfaces converging approximately toward a common center, said driving and driven members being free to move axially and angularly relative to one another, tapered roller members mounted between said converging surfaces of said driving and driven members, and retaining means for said tapered rollers, said retaining means enclosing said tapered rollers throughout a portion of the periphery of their surfaces for engaging the converging surfaces of said driving and said driven members.

14. In a universal joint, the combination of shaft members having co-acting portions, tapered roller members between said co-acting portions, and retainer means for said tapered roller members, said retainer means being provided with tapered wall portions forming a housing extending longitudinally around said tapered roller members.

15. In a universal joint, the combination of shaft members provided with co-acting portions, rollable members each engaging co-acting portions of each of said shaft members, and a retaining means for said rollable members, said retaining means being provided with wall portions extending entirely around each of said co-acting portions, each of the portions of said first mentioned wall portions extending between said co-acting portions being provided with an opening extending transversely relative to the axes of said shaft members, said openings conforming to the shape of said rollable members.

16. In a universal joint, the combination of shaft members provided with co-acting portions having adjacent surfaces converging approximately toward a common center, rollable members engaging the adjacent surfaces of said co-acting portions, and a retainer member for said rollable members, said retainer member being provided with converging wall portions between the adjacent surfaces of said co-acting portions.

17. In a universal joint, the combination of shaft members provided with co-acting portions, rollable members between said co-acting portions, and a retainer member for said rollable members, said retainer member including a pair of members suitably secured together, each of said pair of members being provided with displaced portions to form a housing portion for partially enclosing said rollable members.

18. In a universal joint, the combination of a pair of shaft members, a floating member adjacent said pair of shaft members, rollably mounted members retained in said floating member and engaging said pair of shaft members, said rollably mounted members being adapted to move with said floating member to angular positions relative to the axes of said shaft members, and resiliently actuated means suitably mounted and exerting a thrust outwardly from opposite sides of said floating member to urge said floating member to substantially a central position between said pair of shaft members.

19. In a universal joint, the combination of a pair of shaft members provided with co-acting portions, conical rollers between the co-acting portions of said shaft members, means provided with portions for contacting the outer surfaces of said conical rollers to maintain them in their operative positions, extension members mounted on said means and provided with spherical surfaces, and means for sealing the spherical surfaces of said members.

20. In a universal joint, the combination of a pair of shaft members provided with co-acting portions, roller members engaging the co-acting portions of said pair of shaft members, retaining means for said roller members, extension members connected with said retaining means and provided with spherical surfaces, and resiliently actuated means for sealing the spherical surfaces of said extension members, said resiliently actuated means exerting a thrust to position said retaining means between said shaft members and allowing said retaining means to oscillate relative to said shaft members.

21. In a universal joint, the combination of a driving member, a driven member, roller members each engaging surfaces of said driving and said driven members, retaining means enclosing said roller members, and members mounted on said retaining means and provided with spherical portions suitably mounted around said driving and said driven members to allow angular movement therebetween, said spherical portions of said members mounted on retaining means being slidably mounted relative to said driving and said driven members to allow axial movement thereof.

22. In a universal joint, the combination of a pair of members having co-acting coupling portions, members each rollably engaging co-acting coupling portions of both of said pair of members, and a retainer member for said second mentioned members, said retainer member being provided with wall portions having apertures therein, each of said apertures surrounding one of the co-acting coupling portions of said pair of members.

23. In a universal joint, the combination of a pair of shaft members having co-acting portions, rollers between the co-acting portions of said pair of shaft members, a member for retaining said rollers, extension members suitably supported on said member and provided with oppositely disposed spherical portions, spherically shaped members surrounding each of said pair of shaft members and extending adjacent the oppositely disposed spherical portions of said extension members, packing means suitably mounted between the oppositely disposed spherical portions of said extension members and said spherically shaped members, and packing material suitably mounted between each of said spherically shaped members and one of said pair of shaft members.

24. In a universal joint, the combination of a pair of shafts having co-acting portions, roller members each engaging a co-acting portion of each of said shafts, a pair of spherically shaped members each surrounding one of said pair of shafts, packing material suitably mounted between each of said spherically shaped members and the co-acting portions of said pair of shafts, each of said packing materials surrounding and contacting one of said pair of shafts, resilient means between the co-acting portions of each of said pair of shafts and one of said packing materials, said resilient means tending to compress said packing materials and to move said pair of shafts axially toward each other, means for retaining said roller members and provided with flange portions, a pair of spherically shaped members suitably attached to the flange portions of said means for retaining said roller members, and packing material suitably mounted between said first mentioned pair and said second mentioned pair of spherically shaped members.

THOMAS BARISH.